Feb. 23, 1971 K. OESER 3,564,676
NOISE-ATTENUATING PIPE FASTENER
Filed Oct. 7, 1968 2 Sheets-Sheet 1
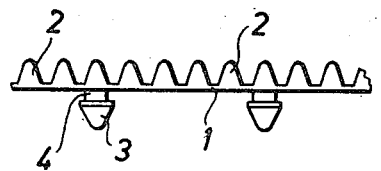
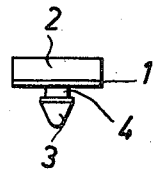
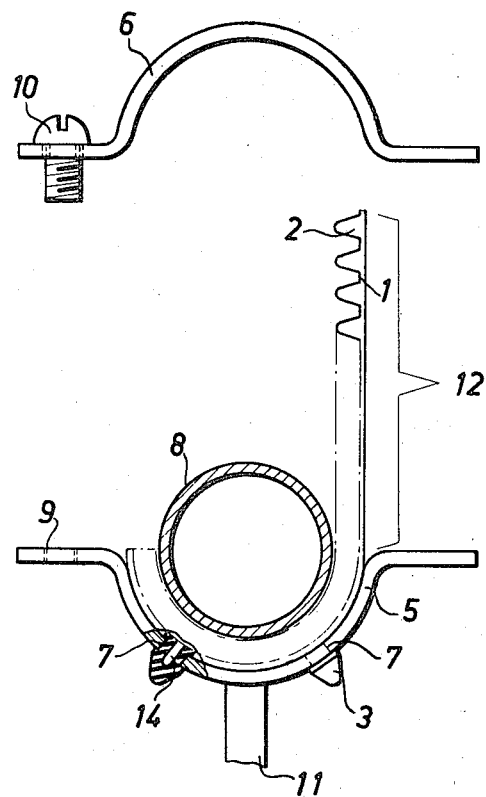
Inventor:
Konrad Oeser Feb. 23, 1971 K. OESER 3,564,676
NOISE-ATTENUATING PIPE FASTENER
Filed Oct. 7, 1968 2 Sheets-Sheet 2

Inventor:
Konrad Oeser
By Richard Ernst
ag't 3,564,676
NOISE-ATTENUATING PIPE FASTENER
Konrad Oeser, Hohr-Grenzhausen, near Coblenz, Germany, assignor to Gesellschaft fur Technischen Fortschritt m.b.H., Hohr-Grenzhausen, Germany, a company of Germany
Filed Oct. 7, 1968, Ser. No. 765,555
Claims priority, application Germany, Oct. 25, 1967, P 16 50 019.9
Int. Cl. B65d 63/00; F16l 3/08
U.S. Cl. 24—279
9 Claims

ABSTRACT OF THE DISCLOSURE

A metallic pipe clip lined with one or more rubber strips having a smooth outer and a corrugated inner face. The smooth face is held against the inner wall of the metal clip by mushroom-shaped buttons passing from the rubber strip through openings of the metal clip. The corrugations or ribs on the inner face are elongated axially of a fastened pipe. Metal-to-metal contact and the resulting ready propagation of noise from the pipe system to a supporting structure is prevented.

BACKGROUND OF THE INVENTION

This invention relates to pipe fasteners, and particularly to a pipe fastener, such as a pipe clip or pipe clamp, equipped to attenuate noise generated in the pipe during transmission of the noise to a supporting structure.

It is known to line metallic pipe clips with rubber sheets to prevent noise transmission. The known arrangements are not satisfactory because the rubber elements are not securely held, and some metal-to-metal contact is established either during installation or during use if the piping arrangement is subjected to vibration so that the rubber damping sheets become ineffective. Attempts to vulcanize a rubber lining to a metallic clip were not fully successful because of high cost. When pipe clips are cut to the size of the pipe to be fastened at a construction site, much of the relatively costly vulcanized material is wasted.

The object of the invention is the provision of a noise-attenuating pipe fastener of the general type described whose elastomeric liner is free from the shortcomings pointed out above.

SUMMARY OF THE INVENTION

According to one basic feature of the invention, the liner includes an elongated strip member of rubber or other elastomeric material which has two opposite longitudinal faces, one of the faces being substantially smooth. The other face is provided with projections. The strip member is fastened to one of the relatively rigid strap portions of the fastener in contiguous relationship of the smooth face to a wall of the strap portion. The wall bounds a passage through the fastener adapted to receive a pipe to be fastened. The projections extend from the other face of the strip member toward the axis of the passage.

The strip member is preferably fastened to the more rigid strap portion by button members on the smooth face whose outwardly tapering heads project from openings in the strap portion.

Other features and many of the attendant advantages of this invention will readily be appreciated as the same becomes better understood by reference to the following detailed description of preferred embodiments when considered in connection with the appended drawings.

BRIEF DESCRIPTION OF THE DRAWINGS

In the drawings:

FIG. 1 shows a rubber liner of the invention in side elevation in the relaxed condition;

FIG. 2 shows the liner of FIG. 1 in front elevation;

FIG. 3 shows a pipe clip equipped with the liner of FIGS. 1 and 2 and an associated pipe in side elevation in the open condition of the clip;

DESCRIPTION OF THE PREFERRED EMBODIMENTS

Figure 4:
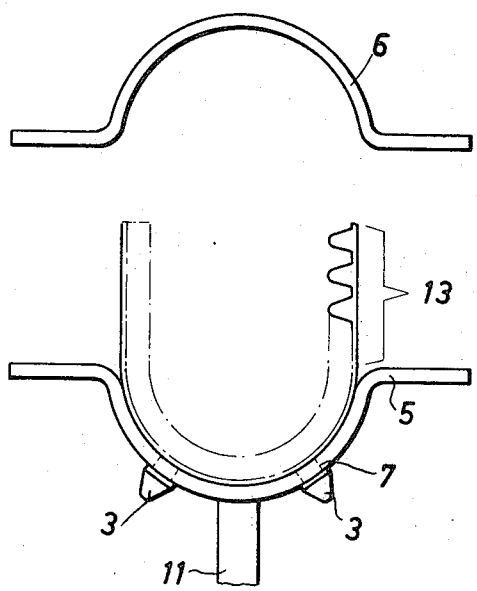
FIG. 4 illustrates a variation on the apparatus of FIG. 3.

Referring initially to FIGS. 1 and 2 there is seen a thin strip 1 of rubber whose upper face, as viewed in FIGS. 1 and 2, carries uniformly spaced, upwardly tapering, transverse ribs 2 of a height about equal to their width as measured at the base of each rib. The lower face is practically smooth except for mushroom-shaped buttons having approximately conical heads 3 joined to the strip 1 by a restricted neck 4, the strip 1, ribs 2, and buttons 3, 4 forming an integrally molded piece of elastomeric material.

When in use, the liner described above is combined with the strap-shaped portions 5, 6 of a metallic or otherwise more rigid pipe clamp. Openings 7 in one strap portion 5 conformingly receive the necks 4 of buttons on the strip 1. The heads 3 project outward from the outer wall of the strap portion 5, and the wide base of each head 3 abuts radially against that wall, thereby holding the smooth face of the strip 1 in contiguous relationship to the inner wall of the strap portion 5 which is thus lined by the firmly attached corrugated rubber liner. A pipe 8 is resiliently cradled on the ridges of the ribs 2.

The two strap portions 5, 6 may be fastened to each other by means of a threaded bore 9 in a flange of the strap portion 5 and a screw 10 freely passing through an opening in a corresponding flange of the strap portion 6. A second pair of corresponding flanges of the strap portions 5, 6 are thereby abuttingly engaged and may also be fastened to each other by threaded fasteners, not shown, in a conventional manner if so desired. A pin 11, only partly illustrated in FIG. 3, extends from the outer wall of the strap portion 5 and permits the latter to be fastened to a building or other support.

About one longitudinal half 12 of the liner is free from buttons and projects upward from the strap member 5 in the open condition of the fastener seen in FIG. 3. When the fastener is to be closed, the liner portion 12 is laid over the upper half of the pipe 8, and held in place by the attached strap member 6. In the closed fastener, the liner forms a ring split near the flanges carrying the illustrated threaded bore 9 and screw 10. Any metal-to-metal contact between the pipe 8 and the strap portions 5, 6 is safely prevented. The liner is firmly held in place by the buttons 3, 4.

Installation of the liner in the perforated strap member 5 is facilitated by blind bores 14 which extend through the strip 1 and each neck 4 and terminate in the head 3. A metal pin inserted in the bore 14 may be used to force the conically tapering head 3 through the opening 7 in a radially outward direction whereupon the spreading head prevents retraction of the button when the pin is withdrawn from the bore 14.

The arrangement of the buttons on the strip 1 may be modified as is shown in FIG. 4 so that the buttons 3, 4 project from the longitudinally central portion of the strip 1 whereas both longitudinally terminal portions 13 are free from buttons. When the buttons are inserted in the two openings 7 of the strap portion 5, the liner assumes a U-shape with the end portions 13 projecting upward from the strap portion 5. When the strap portion 6 is fastened in its normal operating position, the two end portions 13 are bent toward each other until they meet or almost meet diagonally opposite the pin 11 in the passage through the pipe clip.

Figure 5:
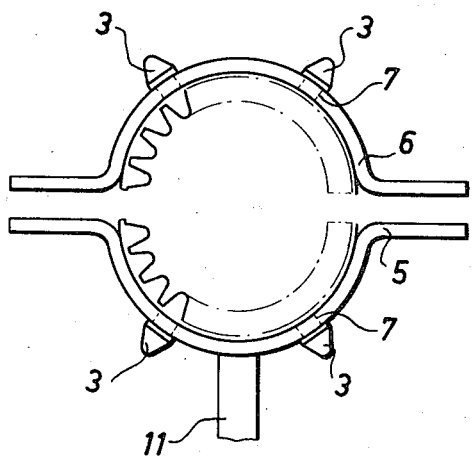
FIG. 5 shows a modification of the apparatus of FIG. 3 in a corresponding view, but without the associated pipe.

A slightly more costly modification of the pipe clip of the invention is shown in FIG. 5. The strap portions 5, 6 are provided with two openings 7 each, and the liner is constituted by two pieces of the material shown in FIG. 1, each having two buttons whose head 3 projects outward from the associated openings 7 and which line the inner walls of the strap portions 5, 6 respectively. When the two strap portions are fastened by threaded fasteners omitted from the showing of FIGS. 4 and 5 for greater clarity, the two semicircular liners, otherwise identical with the material described with reference to FIGS. 1 to 3 completely envelope a pipe received in the passage of the pipe clip. The installation of the clip on a pipe is thus particularly simple.

Transverse ribs 2 have been found to withstand severe stresses during installation of a pipe and axial movement of the pipe in engagement with the ribs even when made of rather soft rubber or other soft elastomeric material which is desirable because of its noise attenuating properties. However, at least some of the advantages of this invention are available with internal projections of other shape, such as ribs which are circumferential relative to the engaged pipe or helical about the pipe axis, and by projections having the shape of short rods. For reasons not fully understood at this time, comparable results cannot be achieved when the ribs or other projections face the rigid fastener members and the smooth face of the strip conformingly engages the pipe.

Elastomers other than natural rubber may be substituted for the material referred to above, and the use of oil-resistant synthetic rubbers is specifically contemplated.

The liners shown in FIGS. 1 to 5 may be cut at the construction site from a continuous strip having one corrugated face and a smooth face provided with widely spaced pairs of buttons, the buttons of each pair being longitudinally offset a fixed, relatively small distance. Severed pieces of such strip may be assembled with metallic strap portions of any desired size in which openings 7 are drilled immediately prior to use. Because of the resiliency of the strip, the spacing of the openings need not be overly precise.

I claim:

1. A noise-attenuating pipe fastener comprising two relatively rigid strap portions one of which is adapted to be secured to a support, means for securing said portions to each other in a position in which said strap portions extend in a common plane and their interior walls bound a passage adapted to receive a pipe therein along an axis transverse of said plane, a separable liner of elastomeric material adapted to encircle said passage between the interior wall of said strap portions and the pipe, said liner comprising a strip member having two opposite longitudinal surfaces the surface of said liner adjacent said strap having at least one protrusion and the interior wall of at least said one support strap portion having a corresponding receptacle for receiving said protrusions to fasten said liner thereto.

2. In a fastener as set forth in claim 1, said liner is formed with a plurality of button members on said one face and extending from the same in a direction away from said axis, each button member having a head portion tapering in the last-mentioned direction, and said strap wall being formed with a plurality of openings therethrough, and said button members passing through respective ones of said openings and projecting from said one strap portion.

3. In a fastener as set forth in claim 2, each button member having a neck portion interposed between said strip member and said head portion, said neck portion being of smaller cross section than the adjacent part of said head portion, and being substantially conformingly received in the associated opening.

4. In a fastener as set forth in claim 3, said strip member, said button members and said projections being integral parts of a unitary structure of said elastomeric material.

5. In a fastener as set forth in claim 2, additional button members on said one face, the other strap portion being formed with openings therethrough respectively receiving said additional button members, a wall of said other strap portion facing said axis contiguously engaging said one face of said strip member adjacent said additional buttons.

6. In a fastener as set forth in claim 2, said projections including ribs elongated transversely of the direction of elongation of said strip member and juxtaposed in said direction in substantially uniformly spaced relationship.

7. In a fastener as set forth in claim 2, said strip member and each of said buttons being formed with a straight blind bore having an orifice in said other face and terminating in said button member.

8. The fastener according to claim 1 wherein the inner surface of said liner is provided with a plurality of projections extending parallel to the axis of said pipe.

9. A liner material for pipe clips and the like comprising an elongated thin strip member having two opposite longitudinal faces, transverse ribs projecting from one of said faces, said ribs being substantially uniformly spaced longitudinally of said strip member, and a plurality of spaced pairs of mushroom-shaped buttons projecting from the other face of said strip member in a longitudinal row, the buttons of each pair being longitudinally spaced from each other a distance substantially smaller than the longitudinal distance between adjacent pairs said buttons being adapted to be received in corresponding apertures formed in said pipe clips so as to be separably fastened thereto.

References Cited

UNITED STATES PATENTS

| 629,315 | 7/1899 | Dorticus | 24—279 |
| 3,099,054 | 7/1963 | Spiro | 248—74X |
| 3,370,815 | 2/1968 | Opperthauser | 248—74 |

FOREIGN PATENTS

| 911,579 | 11/1962 | Great Britain | 24—279 |

J. KARL BELL, Primary Examiner

U.S. Cl. X.R.

248—74